(12) United States Patent
Park et al.

(10) Patent No.: US 10,862,095 B2
(45) Date of Patent: Dec. 8, 2020

(54) BATTERY MODULE WITH IMPROVED COUPLING STRUCTURE BETWEEN ELECTRODE LEAD AND BUS BAR AND METHOD FOR MANUFACTURING THE SAME

(71) Applicant: LG Chem, Ltd., Seoul (KR)

(72) Inventors: Jin-Yong Park, Daejeon (KR); Sang-Woo Ryu, Daejeon (KR); Jeong-O Mun, Daejeon (KR); Jung-Hoon Lee, Daejeon (KR); Ho-June Chi, Daejeon (KR)

(73) Assignee: LG Chem, Ltd., Seoul (KR)

(*) Notice: Subject to any disclaimer, the term of this patent is extended or adjusted under 35 U.S.C. 154(b) by 190 days.

(21) Appl. No.: 15/961,487

(22) Filed: Apr. 24, 2018

(65) Prior Publication Data

US 2018/0315977 A1  Nov. 1, 2018

(30) Foreign Application Priority Data

Apr. 26, 2017  (KR) .................. 10-2017-0053846

(51) Int. Cl.
*H01M 2/20* (2006.01)
*H01M 2/02* (2006.01)
*H01M 2/10* (2006.01)
*H01M 2/26* (2006.01)
*H01M 2/30* (2006.01)

(52) U.S. Cl.
CPC .......... *H01M 2/206* (2013.01); *H01M 2/024* (2013.01); *H01M 2/1016* (2013.01); *H01M 2/1061* (2013.01); *H01M 2/1077* (2013.01); *H01M 2/202* (2013.01); *H01M 2/204* (2013.01); *H01M 2/266* (2013.01); *H01M 2/30* (2013.01)

(58) Field of Classification Search
CPC ....... H01M 2/024–266; H01M 2/1061; H01M 2/1077
See application file for complete search history.

(56) References Cited

U.S. PATENT DOCUMENTS

| 2002/0182480 A1* | 12/2002 | Hanauer | ............... H01M 2/202 429/62 |
| 2006/0286453 A1 | 12/2006 | Nakagawa et al. | |
| 2016/0072115 A1 | 3/2016 | Kim et al. | |

(Continued)

FOREIGN PATENT DOCUMENTS

| JP | 2600369 B2 | 4/1997 |
| JP | H11-025951 A | 1/1999 |
| JP | 2004-327311 A | 11/2004 |

(Continued)

*Primary Examiner* — Osei K Amponsah
(74) *Attorney, Agent, or Firm* — Morgan, Lewis & Bockius LLP

(57) ABSTRACT

Disclosed is a battery module, which includes a plurality of battery cells, each having an electrode lead; and a bus bar configured to electrically the electrode leads of the plurality of battery cells, the bus bar having a plurality of insert slits into which the electrode leads are inserted, and legs formed at both sides of each insert slit, wherein the legs located adjacent to each other with the insert slit being interposed therebetween are directly bonded to each other by a welding portion or connected to each other by a solder in a state of being pressed toward each other.

11 Claims, 11 Drawing Sheets

(56) References Cited

U.S. PATENT DOCUMENTS

2017/0125774 A1   5/2017   Choi et al.

FOREIGN PATENT DOCUMENTS

| JP | 4876444 B2 | 2/2012 |
| JP | 5615045 B2 | 10/2014 |
| KR | 10-2015-0113827 A | 10/2015 |
| KR | 10-2016-0028898 A | 3/2016 |

* cited by examiner

BATTERY MODULE WITH IMPROVED COUPLING STRUCTURE BETWEEN ELECTRODE LEAD AND BUS BAR AND METHOD FOR MANUFACTURING THE SAME

TECHNICAL FIELD

The present application claims priority to Korean Patent Application No. 10-2017-0053846 filed on Apr. 26, 2017 in the Republic of Korea, the disclosure of which is incorporated herein by reference.

The present disclosure relates to a battery module with an improved coupling structure between an electrode lead and a bus bar and a method for manufacturing the battery module, and more particularly, to a battery module configured to improve the contact between an electrode lead and a bus bar without bending the electrode lead and a method for manufacturing the battery module.

BACKGROUND

A bus bar may be used to electrically connect a plurality of battery cells. In particular, a pouch-type battery cell includes an electrode lead drawn to the outside of a pouch case, and the bus bar may be used when it is intended to configure a battery module by electrically connecting several pouch-type battery cells.

Referring to FIGS. 1 and 2, there is shown a conventional battery module in which a plurality of pouch-type battery cells are electrically connected by a bus bar.

The conventional battery module is manufactured by inserting each electrode lead 2 drawn from the plurality of pouch-type battery cells 1 into an insert slit 4 of the bus bar 3 as shown in FIG. 1, and then bending the inserted electrode lead 2 and closely adhering and welding the electrode lead 2 to the bus bar 3 as shown in FIG. 2.

The conventional battery module additionally requires a process of bending the electrode lead 2 in addition to the process of inserting the electrode lead 2 into the insert slit 4 of the bus bar 3 and the welding process, thereby complicating the manufacturing process.

In addition, as the pouch-type battery cell 1 has a smaller thickness, the electrode lead 2 is made to have a shorter length. If the electrode lead 2 is shortened in this way, the bonding area between the electrode lead 2 and the bus bar 3 is also reduced, thereby deteriorating the coupling strength and resultantly increasing the concerns about a product defect.

SUMMARY

The present disclosure is designed to solve the problems of the related art, and therefore the present disclosure is directed to manufacturing a battery module, which may omit a bending process of an electrode lead, easily inserting the electrode lead into a bus bar, and improving the contact between the electrode lead and the bus bar.

However, the technical problem to be solved by the present disclosure is not limited to the above, and other objects not mentioned herein will be clearly understood by those skilled in the art from the following present disclosure.

In one aspect of the present disclosure, there is provided a battery module, comprising: a plurality of battery cells, each having an electrode lead; and a bus bar configured to electrically connect the electrode leads of the plurality of battery cells, the bus bar having a plurality of insert slits into which the electrode leads are inserted, and legs formed at both sides of each insert slit, wherein the legs located adjacent to each other with the insert slit being interposed therebetween are directly bonded to each other by a welding portion or connected to each other by a solder in a state of being pressed toward each other.

The electrode lead may be configured not to be exposed out of the insert slit.

The insert slit may have one open side and the other closed side.

The insert slit may include a bonding portion located relatively closer to one open side; and an insert portion located relatively closer to the other closed side.

The pair of legs adjacent to each other with the insert slit being interposed therebetween may be bonded at the bonding portion.

The electrode lead may include at least one protrusion protruding on one surface or both surfaces thereof.

The bus bar may have at least one fixing groove formed with a groove shape at an inner surface of the insert slit, and the fixing groove may be formed at a location corresponding to the protrusion.

The fixing groove may have a groove depth smaller than a protruding height of the protrusion.

An end of the leg may have a tapered shape so that an entrance of the insert slit has a width gradually increasing outwards.

Meanwhile, the above object can also be achieved by a method for manufacturing a battery module according to an embodiment of the present disclosure, and the method for manufacturing a battery module according to an embodiment of the present disclosure includes a stacking step for stacking a plurality of battery cells; an inserting step for inserting electrode leads provided at the battery cells into insert slits of a bus bar; a pressing step for pressing legs of the bus bar at both sides thereof; and a bonding step for bonding the legs adjacent to each other by welding or soldering.

In the inserting step, the electrode lead may be inserted from one open side of the insert slit along a longitudinal direction of the insert slit.

In the bonding step, the legs adjacent to each other may be welded or soldered in a state of being closely adhered to each other by pressing.

In the pressing step, a region corresponding to the bonding portion where the electrode lead is not located may be pressed.

According to an embodiment of the present disclosure, the bending process of the electrode lead may be omitted in manufacturing a battery module.

Meanwhile, according to another embodiment of the present disclosure, it is possible to minimize the assembling interference that may occur when the electrode lead is inserted into the bus bar due to the movement of the battery cell or the bus bar, and thus it is possible to automate the process of coupling the electrode lead and the bus bar.

According to another embodiment of the present disclosure, since the electrode lead of the battery cell is not exposed out of the bus bar, it is possible to prevent the coupling between the electrode lead and the bus bar from being released due to the interference between the electrode lead and an external article during the assembling process and/or in use, thereby minimizing the occurrence of defective products.

According to another embodiment of the present disclosure, the contact between the electrode lead and the bus bar may be improved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, the overall configuration of a battery module according to an embodiment of the present disclosure will be described with reference to FIGS. 3 to 5.

Figure 1:
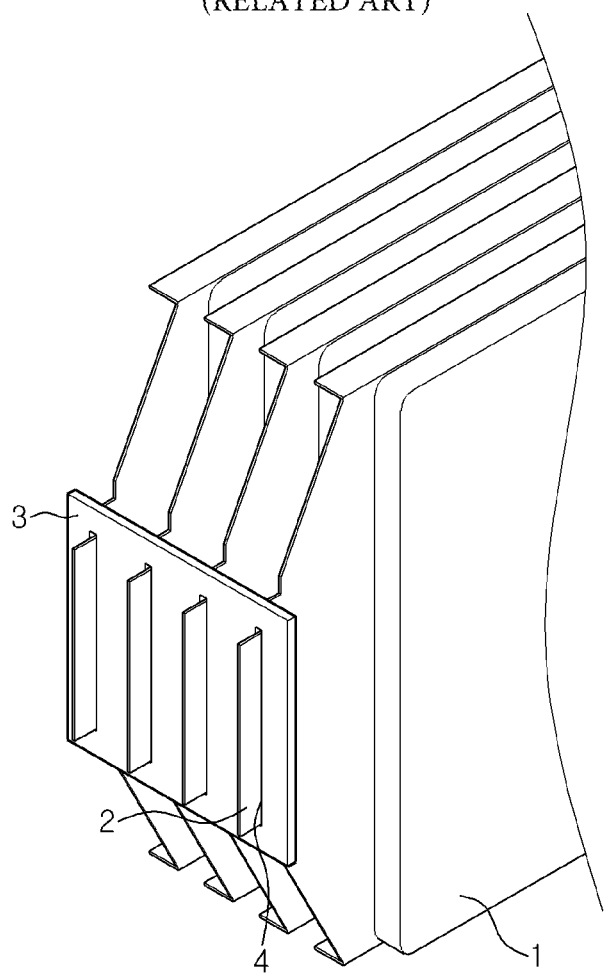
FIGS. 1 and 2 are diagrams for illustrating a process of coupling an electrode lead and a bus bar in manufacturing a conventional battery module.
Figure 2:
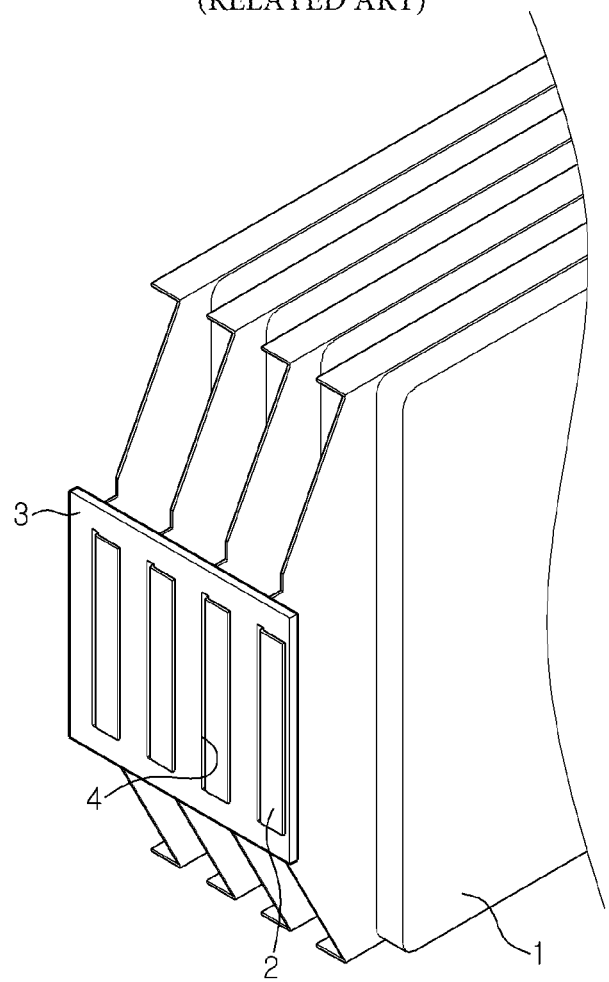
Figure 3:
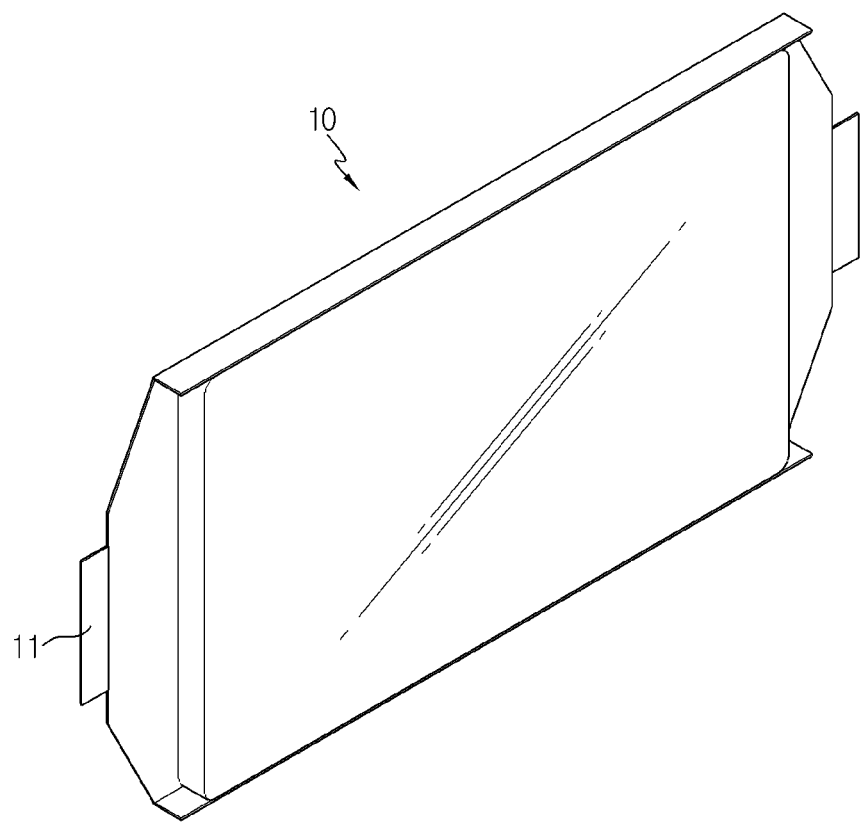
FIG. 3 is a perspective view showing a battery cell employed at a battery module according to an embodiment of the present disclosure.
Figure 4:
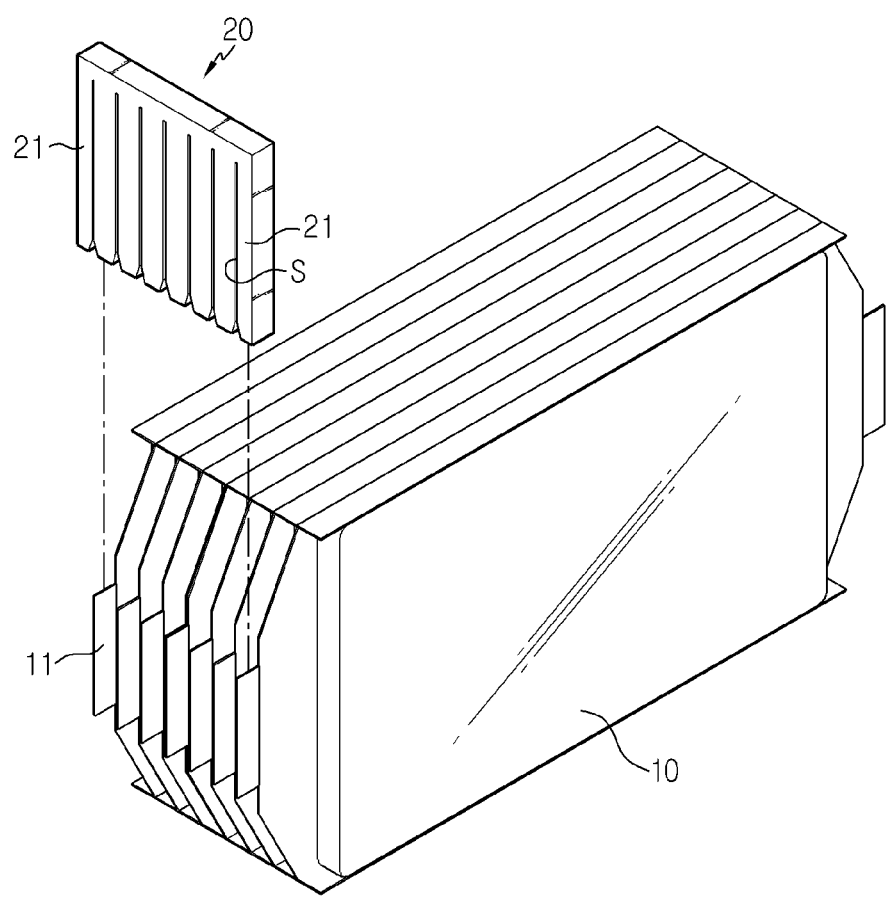
FIG. 4 is a perspective view showing that a battery cell stack and a bus bar of the battery module according to an embodiment of the present disclosure are separated.
Figure 5:
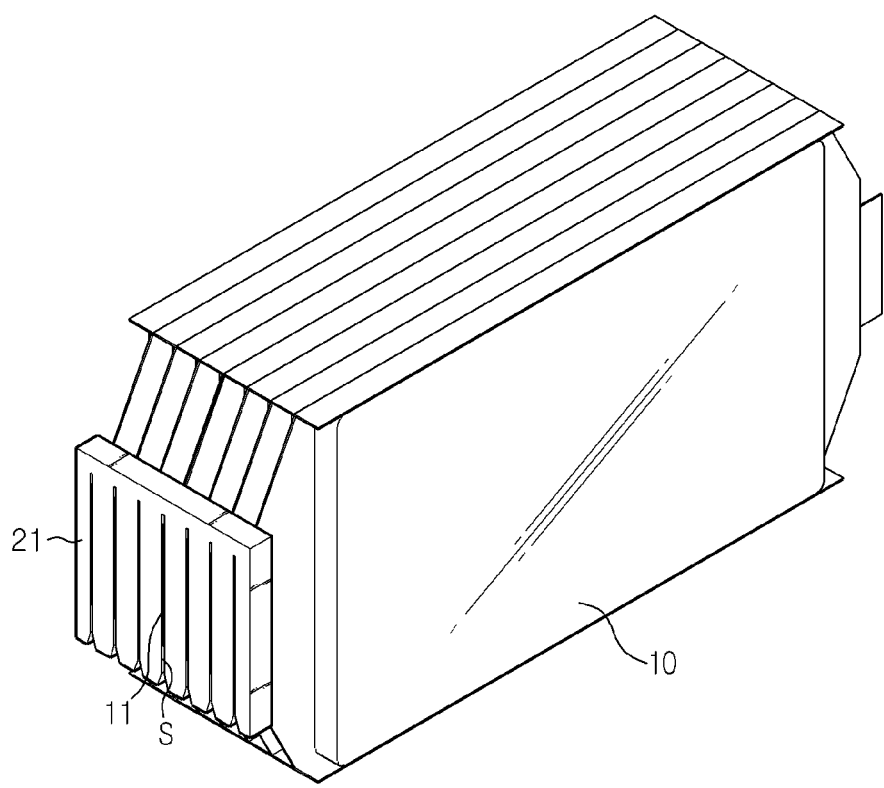
FIG. 5 is a perspective view showing that the battery cell stack and the bus bar of the battery module according to an embodiment of the present disclosure are coupled.

FIG. 3 is a perspective view showing a battery cell employed at a battery module according to an embodiment of the present disclosure, FIG. 4 is a perspective view showing that a battery cell stack and a bus bar of the battery module according to an embodiment of the present disclosure are separated, and FIG. 5 is a perspective view showing that the battery cell stack and the bus bar of the battery module according to an embodiment of the present disclosure are coupled.

Referring to FIGS. 3 to 5, a battery module according to an embodiment of the present disclosure includes a battery cell stack having a plurality of battery cells stacked and a bus bar 20 connecting the plurality of battery cells 10.

Each battery cell 10 constituting the battery cell stack is a pouch-type battery cell, in which an electrode assembly is accommodated in a pouch case, and a pair of electrode leads 11 connected to the electrode assembly may be drawn out of the pouch case and extend in the same direction or in opposite directions.

The drawings of the present disclosure just depict a pouch-type battery cell 10 in which a pair of electrode leads 11 are drawn out in opposite directions, for the sake of convenience. However, the battery cell applied to the battery module according to the present invention is not limited thereto, and the pair of electrode leads 11 may also be drawn out in the same direction.

The battery cells 10 are stacked such that electrode leads 11 having the same polarity are located in the same direction. This is because the electrode leads 11 having the same polarity must be connected to each other when the electrode leads 11 are electrically connected using the bus bar 20. As the electrode leads 11 having the same polarity are electrically connected to each other as above, the battery cells 10 are connected in parallel.

Referring to FIGS. 4 and 5, the bus bar 20 is a component for electrically connecting the electrode leads 11 provided at the respective battery cells 10 and has insert slits S into which the electrode leads 11 are inserted.

The insert slits S provide a space into which the electrode leads 11 of the battery cells 10 drawn in the same direction may be inserted. The bus bar 20 has legs 21 located at both sides of each insert slit S due to the formation of the plurality of insert slits S. The electrode leads 11 inserted in the insert slits S are located to contact the inner surface of the insert slits S, namely both side surfaces of the legs 21, thereby electrically connecting the plurality of battery cells 10 to each other.

Though one electrode lead 11 may be inserted into one insert slit S, the present disclosure is not necessarily limited thereto, and in some cases, two or more electrode leads 11 may be inserted into one insert slit S.

It is preferable that the electrode lead 11 is not exposed out of the insert slit S. That is, the length of the electrode lead 11 may be equal to or shorter than the thickness of the bus bar 20, and the length of the electrode lead 11 is preferably identical to the thickness of the bus bar 20 in order to maximize the contact surface.

If the length of the electrode lead 11 is equal to the thickness of the bus bar 20 as above, it is possible to maximize the contact area between the inner surface of the insert slit S and the electrode lead 11 and also prevent the electrode lead 11 from interfering with an external object while the battery module is being manufactured or used and thus causing a defect, since the electrode lead 11 is not exposed out of the insert slit S.

The insert slit S formed at the bus bar 20 has one open side and the other closed side as shown in the figures. The electrode lead 11 of the battery cell 10 is inserted into the insert slit S from one open side of the insert slit S along the longitudinal direction of the insert slit S.

In addition, one side end of the leg 21 has a tapered shape so that an entrance of the insert slit S has a width gradually increasing outwards. This is to minimize the assembling interference that may be caused by movement of the battery cell stack and/or the electrode lead 11 and/or the bus bar 20, while the bus bar 20 is being coupled to the battery cell stack.

Next, referring to FIGS. 6 and 7, a pressing step and a bonding step for completing a battery module according to an embodiment of the present disclosure will be described.

Figure 6:
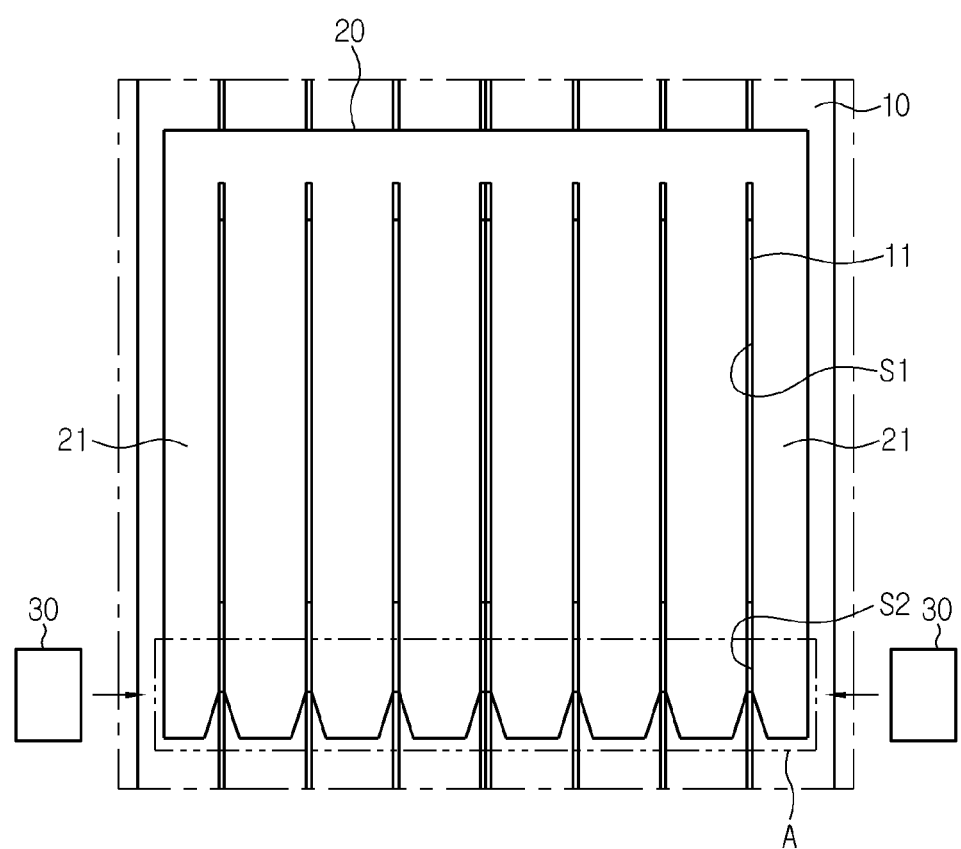
FIG. 6 is a plane view showing that the bus bar is coupled to the battery cell stack of the battery module according to an embodiment of the present disclosure and that the bus bar is pressed by a pressing jig.
Figure 7:
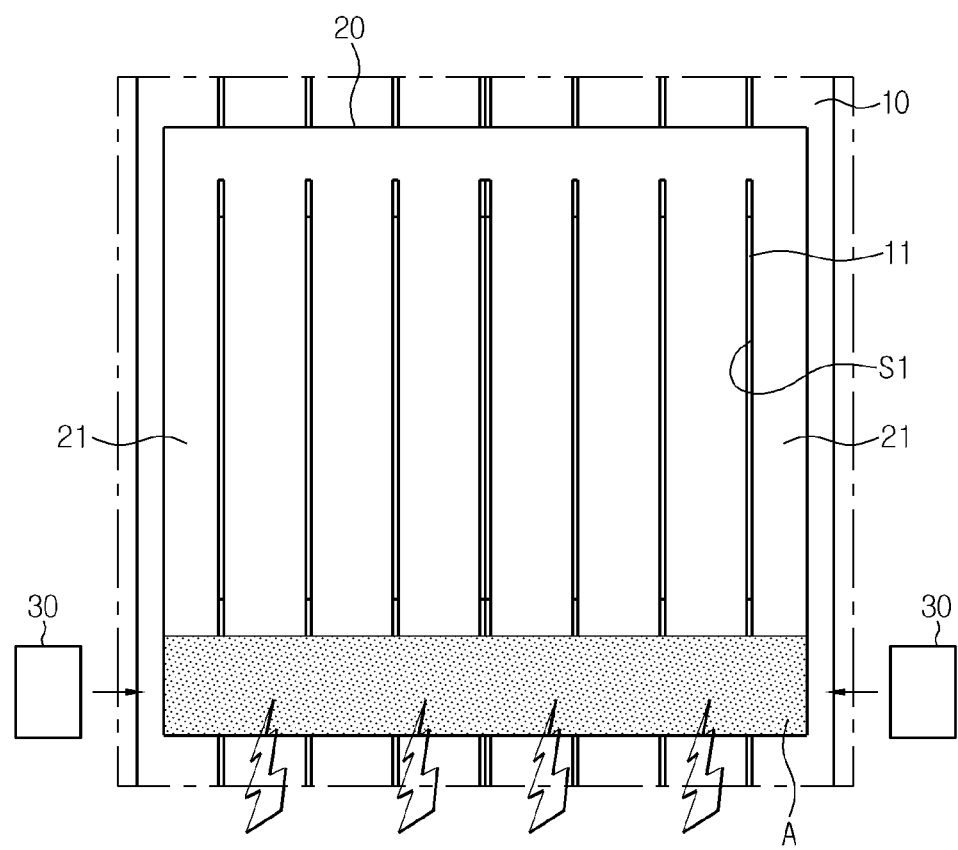
FIG. 7 is a diagram showing that the bus bar is bonded by welding or soldering in a pressed state.

FIG. 6 is a plane view showing that the bus bar is coupled to the battery cell stack of the battery module according to an embodiment of the present disclosure and that the bus bar is pressed by a pressing jig, and FIG. 7 is a diagram showing that the bus bar is bonded by welding or soldering in a pressed state.

First, referring to FIG. 6, the bus bar 20 undergoes a pressing process after being bonded to the battery cell stack by means of the insert slit S. Then, the legs 21 adjacent to each other keeps in close contact with each other with the insert slit S being interposed therebetween, by means of the pressing process.

Since the insert slit S is configured so that its one side is opened and the other side is closed, the insert slit S is classified into a bonding portion S2 located relatively closer to one open side and an insert portion S1 located relatively closer to the other closed side. Here, it is enough that only a region of the leg 21 corresponding to the bonding portions S2 is pressed, without pressing the entire area of the leg 21.

If the both sides of a region A (an inner region indicated by a dotted line) of the legs of the bus bar 20 corresponding to the bonding portion S2 are pressed using a pressing jig 30, the pair of legs 21 adjacent to each other are pressed toward each other and then the pair of legs 21 are brought into contact with each other.

If the pair of legs adjacent to each other are pressed to come into contact with each other as above, the electrode lead 11 in the insert portion S1 is also pressed by the inner walls at both sides of the insert portion S1, and thus the contact area between the electrode lead 11 and the bus bar 20 is increased to reduce the contact resistance, thereby improving the electric conductivity.

Referring to FIG. 7, in a state where the legs of the bus bar 20 are closely adhered to each other due to the pressing by the pressing jig 30, the legs are welded or soldered to form a welding portion or a soldering portion between the legs 21 adjacent to each other, thereby bonding the legs 21 to each other.

If the legs 21 of the bus bar 20 are welded or soldered in a state of being pressed to keep closely adhered to each other, the inner surface of the insert slit S and the electrode lead 11 keep pressed toward each other, thereby improving the contact between the electrode lead 11 and the bus bar 20.

Here, when the legs 21 adjacent to each other are bonded to each other by welding, this means that the legs 21 are directly welded to each other by a bonding region where the legs 21 are joined to each other without using any other material so that the materials of the legs 21 are melted and then welded. In addition, when the legs 21 adjacent to each other are bonded to each other by soldering, this means that a solder serving as a component other than the legs 21 is applied to perform soldering so that both legs 21 are bonded to each other by the solder.

Next, with reference to FIGS. 8 and 9, the detailed structure of the electrode lead 11 for improving the contact between the bus bar 20 and the electrode lead 11 employed at the present disclosure will be described.

Figure 8:
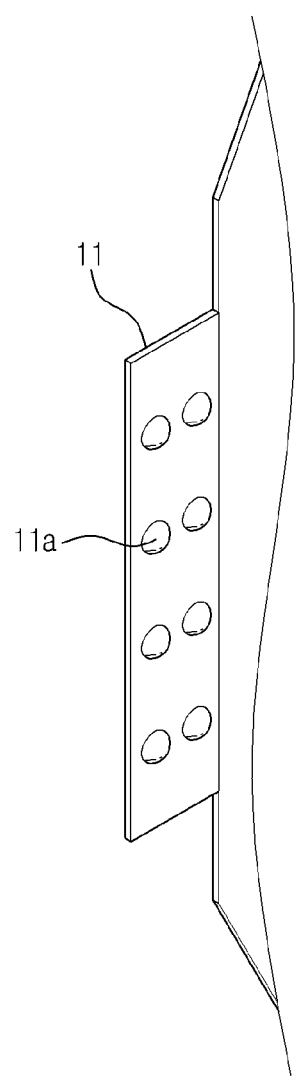
FIGS. 8 and 9 are diagrams showing an electrode lead having a protrusion.
Figure 9:
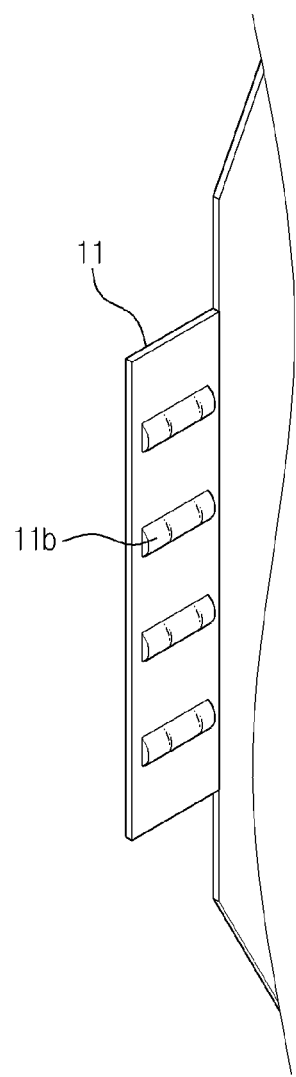

FIGS. 8 and 9 are diagrams showing an electrode lead having a protrusion.

Referring to FIGS. 8 and 9, the electrode lead 11 employed at the present disclosure may include at least one protrusion 11a, 11b protruding from one surface or both surfaces thereof.

The protrusion 11a, 11b may have various shapes. For example, the protrusion 11a, 11b may have a hemispherical embossing form 11a as shown in FIG. 8 or an elongated embossing form 11b as shown in FIG. 9.

If the protrusion 11a, 11b is formed on the surface of the electrode lead 11, the contact between the bus bar 20 and the electrode lead 11 may be further improved.

Next, with reference to FIGS. 10 and 11, the structure of a fixing groove 21a, 21b formed at the bus bar 20 to improve the contact between the bus bar 20 and the electrode lead 11 employed at the present disclosure will be described.

Figure 10:
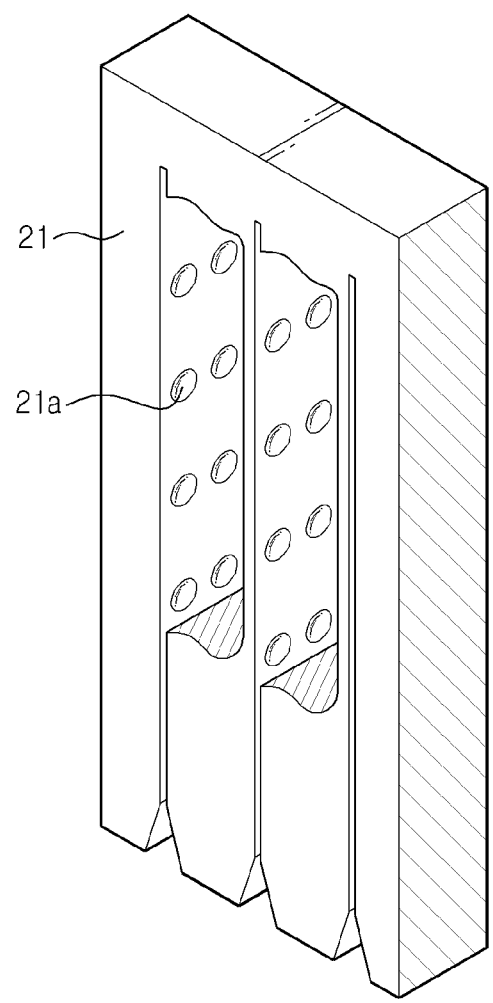
FIGS. 10 and 11 are diagrams showing a bus bar having a fixing groove.
Figure 11:
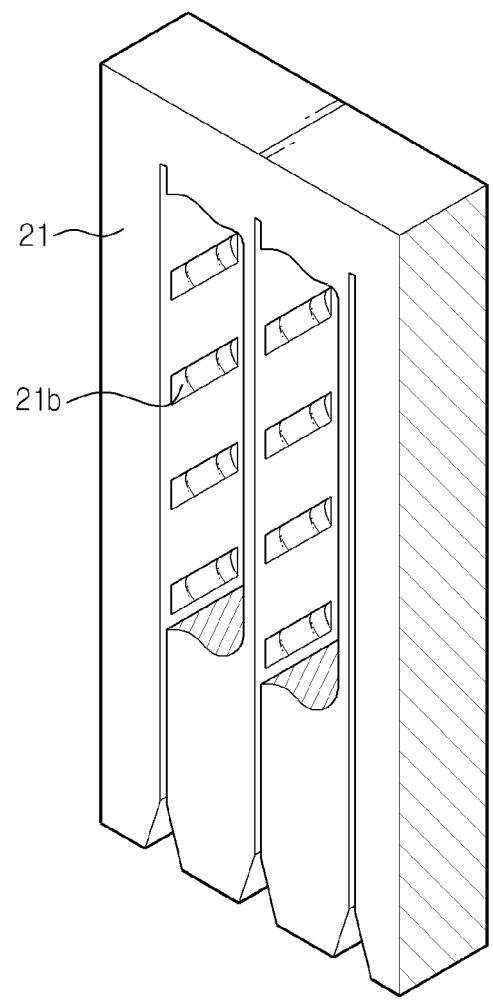

FIGS. 10 and 11 are diagrams showing a bus bar having a fixing groove.

Referring to FIGS. 10 and 11, if the protrusion 11a, 11b as described above is formed on the surface of the electrode lead 11, a fixing groove 21a, 21b having a shape corresponding to the protrusion 11a, 11b may be formed at one surface or both surfaces of the leg 21 that comes into contact with the protrusion 11a, 11b, namely at one inner surface or both inner surfaces the insert slit S, at a location corresponding to the protrusion 11a, 11b.

If the fixing groove 21a, 21b corresponding to the protrusion 11a, 11b having an embossing form is formed at the bus bar 20, the bonding force between the electrode lead 11 and the bus bar 20 may be improved. That is, when the electrode lead 11 is inserted into the insert slit S, the protrusion 11a, 11b is inserted into the fixing groove 21a, 21b. In this state, if the bonding portion S2 is welded or soldered in a state of pressing the leg 21 of the bus bar 20, the protrusion 11a, 11b is not able to escape from the fixing groove 21a, 21b, thereby ensuring very excellent bonding force between the electrode lead 11 and the bus bar 20.

Meanwhile, the fixing groove 21a, 21b may have a groove depth smaller than a protruding height of the protrusion 11a, 11b. If the groove depth of the fixing groove 21a, 21b is smaller than the protruding height of the protrusion 11a, 11b, the protrusion 11a, 11b is engaged with the fixing groove 21a, 21b to improve the coupling between the electrode lead 11 and the bus bar 20, and also it is possible to prevent that the protrusion 11a, 11b does not contact the inner surface of the fixing groove 21a, 21b, thereby improving the contacting therebetween.

Hereinafter, a method of manufacturing a battery module according to an embodiment of the present disclosure will be described.

The method of manufacturing a battery module according to an embodiment of the present disclosure is a process for producing a battery module according to the present disclosure as described above and includes a stacking step, an inserting step, a pressing step and a bonding step.

In the stacking step, a plurality of pouch-type battery cells 10 are stacked. The stacked battery cells 10 respectively have a pair of electrode leads 11 drawn out of the pouch case in the same direction or in different directions, and the battery cells 10 are stacked so that electrode leads 11 having the same polarity are arranged side by side.

In the inserting step, the electrode leads 11 of the battery cells 10 are inserted into the insert slits S of the bus bar 20. In this case, the inserting process is performed along the longitudinal direction of the insert slit S from one open side of the insert slit S.

Meanwhile, if the protrusion 11a, 11b is formed at the electrode lead 11 and the fixing groove 21a, 21b shaped corresponding to the protrusion 11a, 11b is formed at the leg 21 of the bus bar 20, the inserting step is performed until the protrusion 11a, 11b is placed in the fixing groove 21a, 21b.

The pressing step is to increase the contact between the electrode lead 11 inserted into the insert slit S and the bus bar 20, and in the pressing step, the leg 21 of the bus bar 20 is pressed at both sides thereof. The bus bar 20 is pressed in a region corresponding to the bonding portion S2 where the electrode lead 11 is not located, and the pressing step is performed so that the legs 21 are closely adhered to each other.

In the bonding step, the legs 21 adjacent to each other and closely adhered to each other by pressing are bonded by welding or soldering. If the bonding step is performed, the legs 21 adjacent to each other may keep closely adhered to each other, and by doing so, the electrode leads 11 and the legs 21 of the bus bar 20 may be pressed toward each other and thus closely adhered to each other, thereby reducing the contact resistance.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

10: battery cell
11: electrode lead
11a, 11b: protrusion
20: bus bar
21: leg
21a, 21b: fixing groove
S: insert slit
S1: insert portion
S2: bonding portion
30: pressing jig

What is claimed is:

1. A battery module, comprising:
a plurality of battery cells, each having an electrode lead; and
a bus bar configured to electrically connect the electrode leads of the plurality of battery cells,
the bus bar having a plurality of insert slits into which the electrode leads are inserted, and legs formed at both sides of each insert slit,
wherein the legs located adjacent to each other with the insert slit being interposed there between are directly bonded to each other by a welding portion or connected to each other by a solder in a state of being pressed toward each other,
wherein the electrode lead does not protrude outside of the insert slit,
wherein the electrode lead includes at least one protrusion protruding on one surface or both surfaces thereof, and
wherein the bus bar includes at least one fixing groove, and the fixing groove is at a location corresponding to the protrusion.

2. The battery module according to claim 1,
wherein the insert slit has one open side and the other closed side.

3. The battery module according to claim 2, wherein the insert slit includes:
a bonding portion located relatively closer to one open side; and
an insert portion located relatively closer to the other closed side.

4. The battery module according to claim 3,
wherein the pair of legs adjacent to each other with the insert slit being interposed
therebetween are bonded at the bonding portion.

5. The battery module according to claim 1,
wherein the fixing groove is formed with a groove shape at an inner surface of the insert slit.

6. The battery module according to claim 5,
wherein the fixing groove has a groove depth smaller than a protruding height of the protrusion.

7. The battery module according to claim 1,
wherein an end of the leg has a tapered shape so that an entrance of the insert slit has a width gradually increasing outwards.

8. A method for manufacturing a battery module, comprising:
a stacking step for stacking a plurality of battery cells;
an inserting step for inserting electrode leads provided at the battery cells into insert slits of a bus bar,
wherein the electrode leads do not protrude outside of the insert slits after the inserting step,
wherein the electrode leads include at least one protrusion protruding on one surface or both surfaces thereof, and
wherein the bus bar includes at least one fixing groove, and the fixing groove is configured to be at a location corresponding to the protrusion;
a pressing step for pressing legs of the bus bar at both sides thereof; and
a bonding step for bonding the legs adjacent to each other by welding or soldering.

9. The method for manufacturing a battery module according to claim 8,
wherein in the inserting step, the electrode lead is inserted from one open side of the insert slit along a longitudinal direction of the insert slit.

10. The method for manufacturing a battery module according to claim 8,
wherein in the bonding step, the legs adjacent to each other are welded or soldered in a state of being closely adhered to each other by pressing.

11. The method for manufacturing a battery module according to claim 8,
wherein in the pressing step, a region corresponding to the bonding portion where the electrode lead is not located is pressed.

* * * * *